(12) United States Patent  (10) Patent No.: US 8,760,276 B2
Yamazato                    (45) Date of Patent: Jun. 24, 2014

(54) COLLISION DETECTOR AND WARNING APPARATUS WHICH DEFINES AN ENTER-DETERMINATION AREA AND AN EXIST-DETERMINATION AREA

(75) Inventor: Narihito Yamazato, Toyota (JP)

(73) Assignee: Denso Corporation, Kariya (JP)

( * ) Notice: Subject to any disclaimer, the term of this patent is extended or adjusted under 35 U.S.C. 154(b) by 273 days.

(21) Appl. No.: 13/311,585

(22) Filed: Dec. 6, 2011

(65) Prior Publication Data

US 2012/0139715 A1 Jun. 7, 2012

(30) Foreign Application Priority Data

| Dec. 6, 2010 | (JP) | 2010-271711 |
| Dec. 6, 2010 | (JP) | 2010-271712 |
| Nov. 30, 2011 | (JP) | 2011-262250 |
| Nov. 30, 2011 | (JP) | 2011-262251 |

(51) Int. Cl.
    *G08B 21/00* (2006.01)
(52) U.S. Cl.
    USPC ........... 340/436; 340/435; 340/438; 340/456; 340/459; 701/51; 701/70; 701/301
(58) Field of Classification Search
    USPC .......... 340/435, 436, 438, 456, 459; 701/301, 701/70, 51
    See application file for complete search history.

(56) References Cited

U.S. PATENT DOCUMENTS

| 5,515,287 A * | 5/1996 | Hakoyama et al. ........... 701/301 |
| 5,530,651 A * | 6/1996 | Uemura et al. ............... 701/301 |
| 2004/0122573 A1 * | 6/2004 | Mizutani .................... 701/45 |
| 2005/0090950 A1 | 4/2005 | Sawamoto et al. |
| 2008/0243389 A1 | 10/2008 | Inoue et al. |
| 2009/0143951 A1 * | 6/2009 | Takahashi et al. ............... 701/70 |

FOREIGN PATENT DOCUMENTS

| JP | H10-095291 | 4/1998 |
| JP | 2000-187075 | 7/2000 |
| JP | 2000-187799 | 7/2000 |
| JP | 2000-353298 | 12/2000 |
| JP | 2003-081035 | 3/2003 |

(Continued)

OTHER PUBLICATIONS

Office Action issued Sep. 3, 2013 in corresponding JP Application No. 2011-262250 (with English translation).

(Continued)

*Primary Examiner* — Nabil Syed
*Assistant Examiner* — Mark Rushing
(74) *Attorney, Agent, or Firm* — Harness, Dickey & Pierce, PLC

(57) ABSTRACT

A collision detector accurately detects a situation where a subject vehicle is likely to come into contact with an external object. The collision detector defines a subject area including an enter-determination area and an exist-determination area. The enter-determination area is defined to determine that the external object entering therein is likely to come into contact with the subject vehicle. The exist-determination area is defined to determine that the external object existing therein is likely to come into contact with the subject vehicle. The detector determines whether the external object comes into the enter-determination area or the external object exists in the exist-determination area. The detector outputs that the subject vehicle is likely to come into contact with the external object when the external object comes into the enter-determination area or when the external object exists in the exist-determination area.

21 Claims, 8 Drawing Sheets

(56) References Cited

FOREIGN PATENT DOCUMENTS

| | | |
|---|---|---|
| JP | 2004-062380 | 2/2004 |
| JP | 2005-044167 | 2/2005 |
| JP | 2005-343426 | 12/2005 |
| JP | 2008-242544 | 10/2008 |
| JP | 2010-033443 | 2/2010 |

OTHER PUBLICATIONS

Office Action issued Sep. 3, 2013 in corresponding JP Application No. 2011-262251 (with English translation).

* cited by examiner

R-POSITION

P-POSITION

D-POSITION AT LOW SPEED

D-POSITION AT HIGH SPEED

TRAVELING BACKWARD

TRAVELING BACKWARD

R-POSITION

| D1<br>W1 | BRAKE STOPPING DISTANCE IN A CASE THAT SUBJECT VEHICLE SPEED IS GRADUALLY DECREASED BY DECELERATION OF 0.4G AFTER FREE RUNNING TIME OF 0.7 SECONDS |
| --- | --- |
| | ※ORDINAL BRAKE STOPPING DISTANCE |
| D2<br>W2 | BRAKE STOPPING DISTANCE IN A CASE THAT SUBJECT VEHICLE SPEED IS RAPIDLY DECREASED BY DECELERATION OF 0.7G (SUDDEN BRAKING) |
| | ※MINIMUM BRAKE STOPPING DISTANCE |

COLLISION DETECTOR AND WARNING APPARATUS WHICH DEFINES AN ENTER-DETERMINATION AREA AND AN EXIST-DETERMINATION AREA

CROSS-REFERENCE TO RELATED APPLICATION

This application is based on Japanese Patent Applications No. 2010-271711 filed on Dec. 6, 2010, No. 2010-271712 filed on Dec. 6, 2010, No. 2011-262250 filed on Nov. 30, 2011, and No. 2011-262251 filed on Nov. 30, 2011, the disclosures of which are incorporated herein by reference.

FIELD OF THE INVENTION

The present invention relates to a collision detector which detects a situation where a subject vehicle is likely to come into contact with an external object, and a warning apparatus which issues a warning that the subject vehicle is likely to come into contact with the external object.

BACKGROUND OF THE INVENTION

JP-2008-242544A (US-2008/0243389A1) shows a collision detector (warning apparatus) which defines an warning area based on a relative speed between a subject vehicle and an external object and which makes a warning that the subject vehicle is likely to come into contact with the external object when the external object comes into the warning area.

In the above collision detector, if a pedestrian moves at a vicinity of a subject vehicle in a direction which is the same as a direction in which the subject vehicle will start, it is likely that no warning area may be defined in such a manner as to include a position of the pedestrian. Under such a condition, the subject vehicle starts and it can not be determined that a contact between the subject vehicle and the pedestrian will occur until a relative speed therebetween is varied. Thus, it may be too late to output a signal indicating that they may come into contact with each other.

Further, in the above conventional collision detector, it is determined whether the subject vehicle may come into contact with an external object under an assumption that the subject vehicle travels forward in a constant direction. If a direction in which the subject vehicle travels is varied after the subject vehicle stopped, it is likely to incorrectly determine that the subject vehicle may come into contact with the external object.

SUMMARY OF THE INVENTION

The present invention is made in view of the above matters, and it is an object of the present invention to provide a collision detector which is able to accurately detect a situation where a subject vehicle is likely to come into contact with an external object.

According to the present invention, a collision detector includes a subject area defining portion which defines a subject area including an enter-determination area and an exist-determination area. The enter-determination area is defined to determine that the external object entering therein is likely to come into contact with the subject vehicle. The exist-determination area is defined to determine that the external object existing therein is likely to come into contact with the subject vehicle. The collision detector further includes: an information obtaining portion which obtains an information about a movement vector of the external object; a first determining portion which determines, based on the information about the movement vector, whether the external object moves into the enter-determination area; a second determining portion which determines, based on the information, whether the external object exists in the exist-determination area; and an output portion which outputs that the subject vehicle is likely to come into contact with the external object when the external object comes into the enter-determination area or when the external object exists in the exist-determination area.

That is, according to the present invention, the enter-determination area is defined to detect the external object entering therein, and the exist-determination area is defined to detect the external object existing therein. And then, it is determined whether the external object is likely to come into contact with the subject vehicle. When determining whether the external object will come into contact with the subject vehicle, the area where the determination is executed varies according to whether the external object is far from the subject vehicle or close to the subject vehicle moves. Further, the area varies according to a moving speed of the external object.

Moreover, according to the moving speed of the object, a driver's recognition of the moving object is varied. It is preferable to define the area based on the driver's recognition.

Therefore, according to the present invention, the collision detector determines whether an external object is likely to come into contact with the subject vehicle in a region which is individually defined with respect to an external object far from the subject vehicle and an external object close to the subject vehicle. The detection accuracy can be improved. Even if the subject vehicle is stopped, the external object can be appropriately detected.

According to another aspect of the present invention, a collision detector includes: a travel direction obtaining portion which obtains a traveling-direction information about whether the subject vehicle is stopped or is traveling forward or backward; a subject area defining portion which defines a subject area in which it is likely that the external object may be in contact with the subject vehicle; and an output portion which outputs that the subject vehicle will be in contact with the external object when the external object exists in the subject area or the external object comes into the subject area.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Configuration of Embodiment

Figure 1:
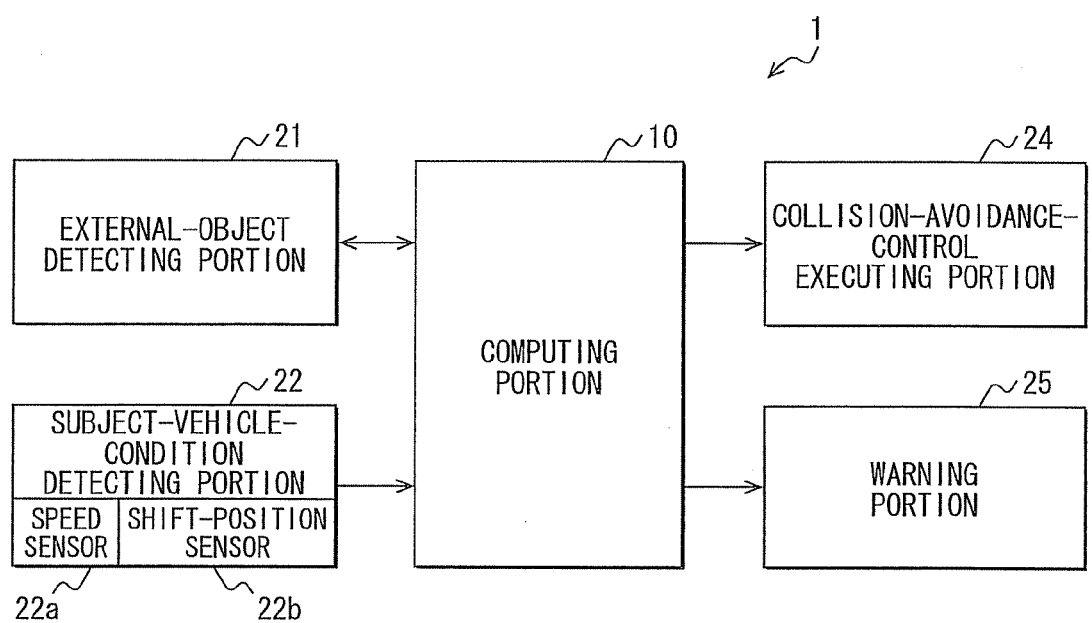
FIG. 1 is a block diagram schematically showing a vehicle collision avoidance system.

FIG. 1 is a block diagram showing a configuration of a vehicle collision avoidance system 1 to which the present invention is applied. This system 1 detects whether a subject vehicle is likely to come into contact with an external object. When it is detected that the subject vehicle is likely to come into contact with the external object, the system 1 executes a collision avoidance control and makes a warning.

The collision avoidance system 1 includes a computing portion 10, an external-object detecting portion 21, a subject-vehicle-condition detecting portion 22, a collision-avoidance-control executing portion 24 and a warning portion 25. It should be noted that only one of the collision-avoidance-control executing portion 24 and the warning portion 25 may be provided.

The computing portion 10 is a microcomputer including a CPU, a ROM, a RAM and the like. The computing portion 10 executes various processings such as the collision avoidance control according to programs stored in the ROM and the RAM and detection signals from the detecting portions 21 and 22.

The external-object detecting portion 21 is provided with functions of a well-known radar or a well-known sonar which output electromagnetic waves or sonic waves and receive reflected waves so that a relative-displacement vector (position, speed, direction) of the external object relative to the subject vehicle is detected. Further, the external-object detecting portion 21 has a function of a vehicle-to-vehicle-communications apparatus which outputs and receives information about a position of the vehicle, a vehicle advance direction and a vehicle travel speed between the subject vehicle and other vehicles. The portion 21 transmits the above detection results to the computing portion 10.

Figure 3A:
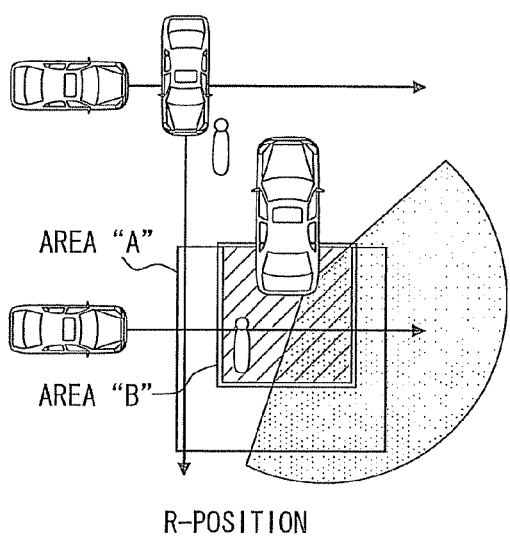
FIGS. 3A, 3B, 3C and 3D are bird's-eye views showing a relation between a shift-position and an area in which an external object is detected.
Figure 3B:
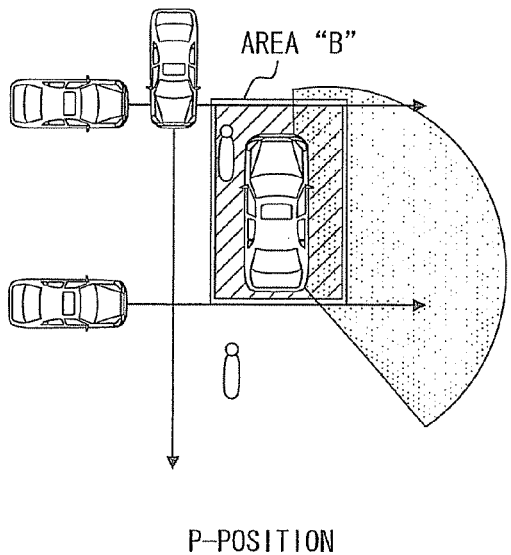

The external-object detecting portion 21 outputs the electromagnetic waves or the sonic waves along a center line at an angle of 60° on either side of the center line, thus defining a detection region. Additionally, the portion 21 can swing the center line, as shown in FIGS. 3A and 3B. A mechanism for swinging the center line of the waves is well-known mechanism.

The subject-vehicle-condition detecting portion 22 is provided with a vehicle speed sensor 22a and a shift-position sensor 22b. The shift-position sensor 22b detects the current shift-position (P: parking, R: reverse, D: drive). The portion 22 sends information about at least the subject vehicle speed and the current shift-position to the computing portion 10.

The collision-avoidance-control executing portion 24 controls brake-oil pressure and tension of a seat belt. When the portion 24 receives an instruction to execute the collision avoidance control from the computing portion 10, the portion 24 automatically reduces the subject vehicle speed and/or strengthens the tension of the seat belt.

The warning portion 25 is provided with a display and/or a speaker (not shown) for warning a driver of the subject vehicle that the subject vehicle is likely to come into contact with the external object.

Operation of Embodiment

Figure 2:
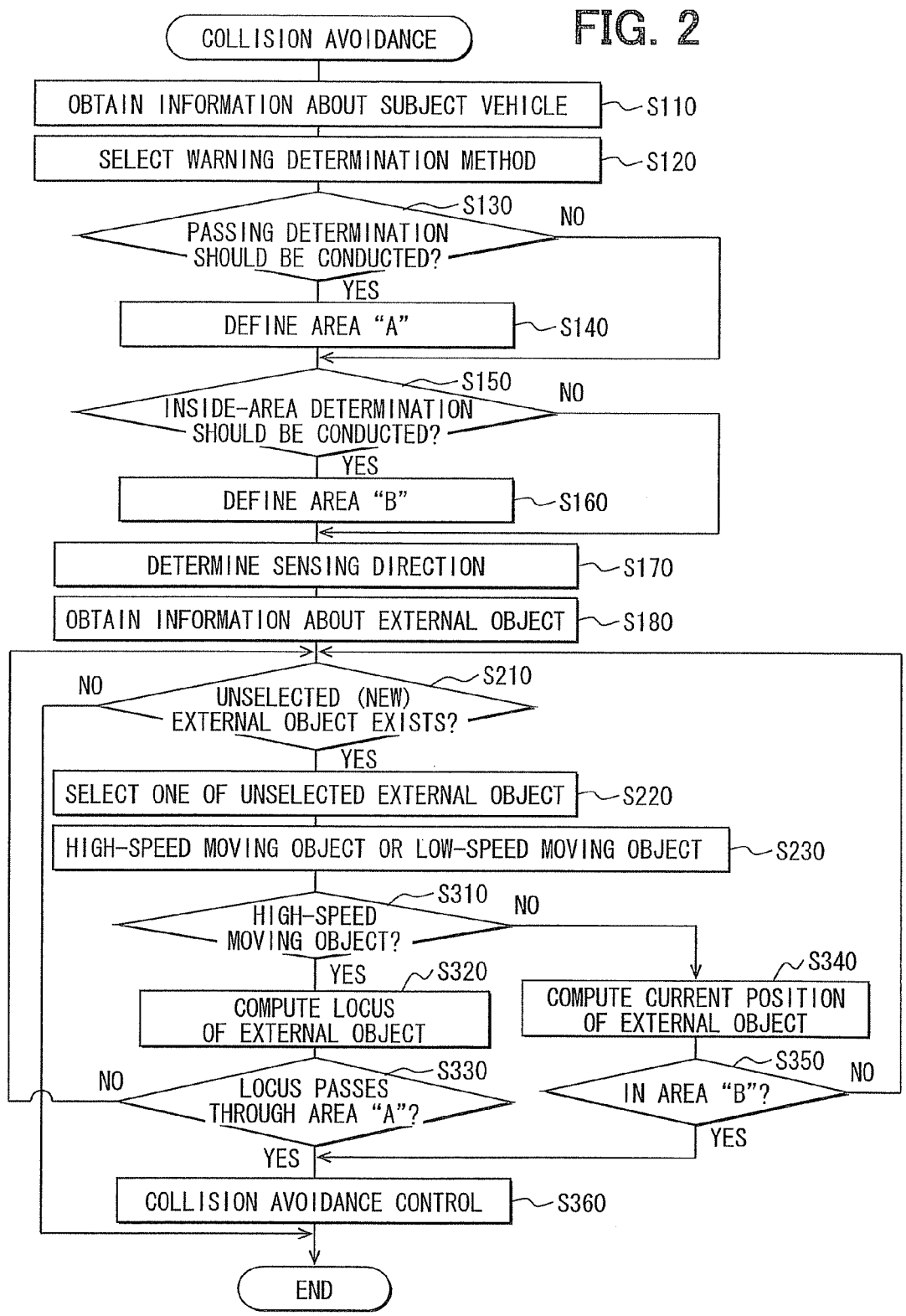
FIG. 2 is a flowchart showing a collision avoidance control.

An operation of the collision avoidance system 1 will be described hereinafter. FIG. 2 is a flowchart showing a collision-avoidance processing which the computing portion 10 executes.

When the computing portion 10 is energized, the collision-avoidance processing starts. Then, this processing is repeatedly executed at regular intervals (for example, 100 µsec.). In step S110, the information about the subject vehicle is obtained. The computing portion 10 receives the information about the subject vehicle speed and the shift-position of the subject vehicle from the subject-vehicle-condition detecting portion 22. The shift-position information indicates whether the subject vehicle is stopped, traveling forward, or traveling backward.

In step S120, a method for warning determination is selected. In the present embodiment, an area "A" for an inside-area determination and an area "B" for a passing determination are defined. In the area "A", a warning is conducted with respect to an external object inside of the area "A". In the area "B", a warning is conducted with respect to an external object which will come into the area "B" in a near future. In step S120, it is determined which one of areas "A" and "B" is used or both of them are used according to the shift-position of the subject vehicle.

Specifically, when the shift-position is R-position (refer to FIG. 3A) or when the shift-position is D-position and the subject vehicle speed is less than a reference value, for example, 30 km/h (refer to FIG. 3C), the area "A" and the area "B" are used. When the shift-position is P-position (refer to FIG. 3B), only the area "B" is used. When the shift-position is D-position and the subject vehicle speed is not less than the reference value (refer to FIG. 3D), only the area "A" is used.

In order to eliminate meaningless warning for a driver of the subject vehicle, the area "A", "B" or both areas "A" and "B" are selected. That is, when the shift-position is P-position, only area "B" is used for searching. Even if a warning is issued to an external object coming close to the subject vehicle which is stopped, the stopped subject vehicle can do nothing to avoid the external object. Thus, no warning is issued. For this reason, when the shift-position is P-position, it is unnecessary to define the area "A".

When the shift-position is D-position and the subject vehicle speed is not less than the reference value, only the area "A" is used for searching. When the subject vehicle is traveling at high speed, even if a warning is issued with respect to an external object which exists at a vicinity of the subject vehicle, it is hard to avoid a collision. Further, it is likely that the external object may be erroneously detected. Thus, no warning is issued to a driver of the subject vehicle. For this reason, when the shift-position is D-position and the subject vehicle speed is not less than the reference value, it is unnecessary to define the area "B" for searching.

In step S130, it is determined whether the passing determination should be conducted according to the selected warning determination method. When the answer is YES in step S130, the procedure proceeds to step S140 in which the area "A" is defined.

As shown in FIGS. 3A, 3C, 3D and 4A, the area "A" is defined in a direction where the subject vehicle travels. Especially, according to the present embodiment, the area "A" is defined on the basis of a driver position of the subject vehicle.

When the subject vehicle is traveling forward (or backward), the area "A" is defined as above. If the subject vehicle is traveling forward (backward), it is less possible for the subject vehicle to travel backward (forward) suddenly. Thus, it is enough to define the area "A" in a direction where the subject vehicle is traveling.

In a case that the shift-position is R-position or D-position, the area "A" is defined in such a manner as to include 100% of the subject vehicle width at its both sides. As to the longitudinal length of the area "A", a distance "D" from an end of the subject vehicle in the traveling direction is defined according to the subject vehicle speed. As shown in FIG. 4B, the distance "D" is defined as to be longer as the subject vehicle speed increases. More specifically, as the opening degree of a throttle valve becomes larger, the distance "D" is set longer.

Figure 4A:
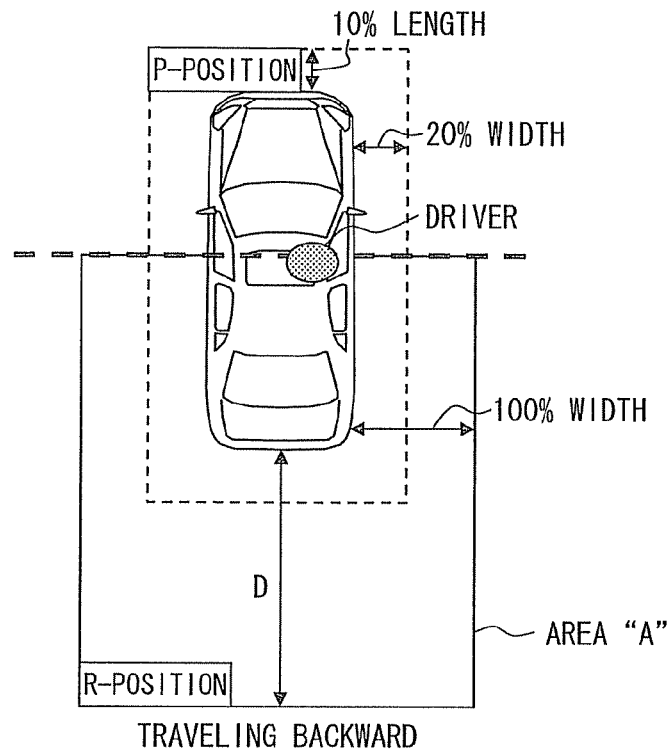
FIG. 4A is a bird's-eye view for explaining an area "A"
Figure 4B:
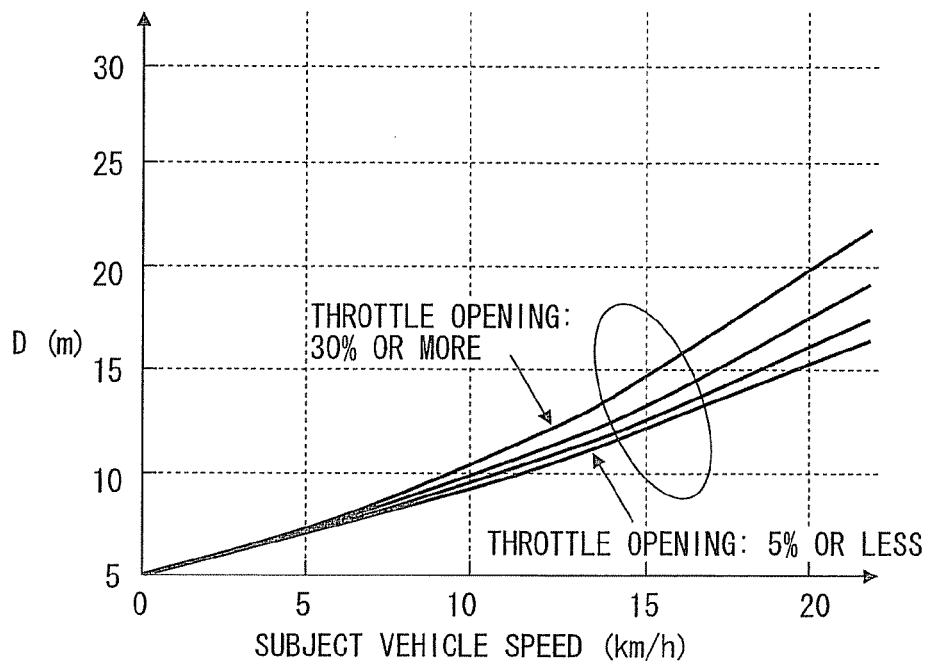
FIG. 4B is a graph for explaining a relationship between a subject vehicle speed and a distance "D"

FIG. 4A shows the region "A" in a case that the shift-position is R-position. Meanwhile, in a case that the shift-position is D-position, the area "A" is defined in an anterior area of the subject vehicle. Although it is described above that the area "A" is not necessary in a case of P-position, the area "A" may be defined.

In this case, as shown by a dashed line in FIG. 4A, the area "A" is defined in such a manner as to include 20% of the subject vehicle width at its both sides. Further, the area "A" is defined in such a manner as to include 10% of the subject vehicle length at its front and rear ends. Since it is less possible for the stopped subject vehicle to travel long distance rapidly, the area "A" is defined as above in a case that the subject vehicle is stopped.

Referring back to FIG. 2, after the process in step S140 is completed, the procedure proceeds to step S150. When the answer is NO in step S130, the procedure proceeds to step S150. In step S150, it is determined whether the inside-area determination should be conducted. When the answer is YES in step S150, the procedure proceeds to step S160 in which the area "B" is defined.

As shown in FIGS. 3A, 3B, 3C and 5A, the area "B" is defined as an individual area with respect to the area "A". The area "B" may be the same area as the area "A".

Figure 5A:
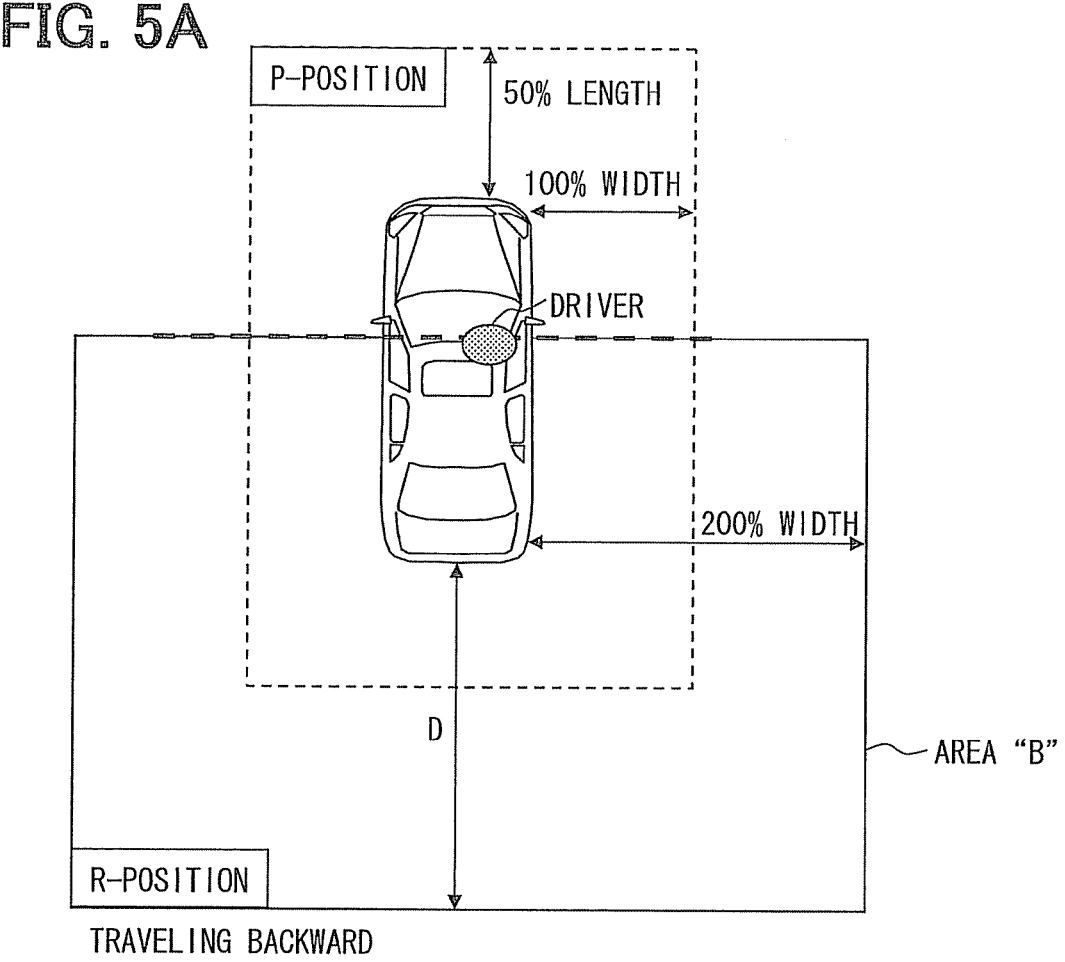
FIG. 5A is a bird's-eye view for explaining an area "B"

In a case that the shift-position is P-position, as shown by a dashed line in FIG. 5A, the area "B" is defined in such a manner as to include 100% of the subject vehicle width at both sides of the subject vehicle. Further, the area "B" is defined in such a manner as to include 50% of the subject vehicle length at its front and rear ends. In a case that the shift-position is R-position or D-position, the area "B" is defined in such a manner as to include 200% of the subject vehicle width at both sides of the subject vehicle. As to the longitudinal length of the area "B", a distance "D" from an end of the subject vehicle in the traveling direction is defined according to the subject vehicle speed.

Figure 5B:
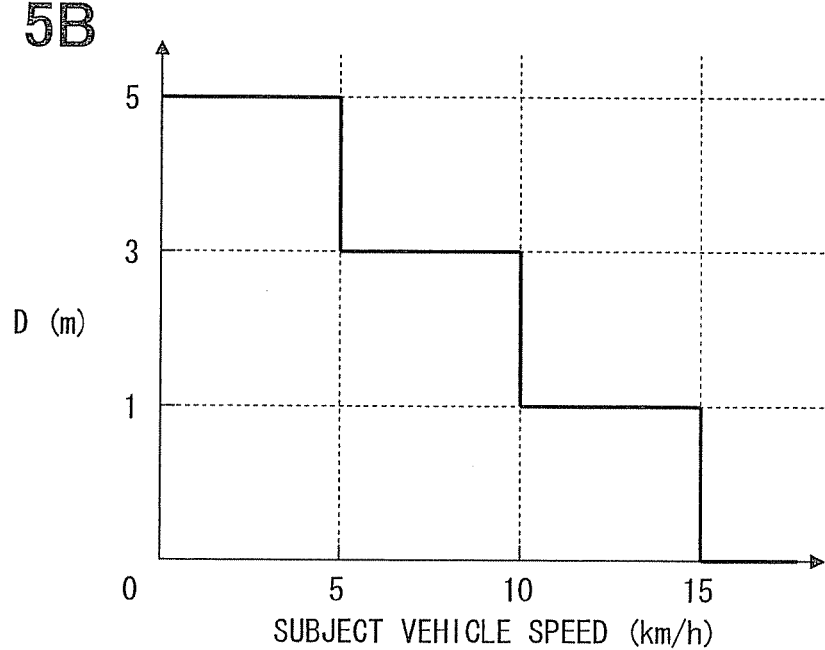
FIG. 5B is a graph for explaining a relationship between a subject vehicle speed and a distance "D"

As shown in FIG. 5B, the distance "D" is defined as to be shorter stepwise as the subject vehicle speed increases. The control portion 10 determines that the vehicle speed is intentionally increased and a driver can recognize the external object enough, so that superfluous warning can be restricted.

Figure 8:
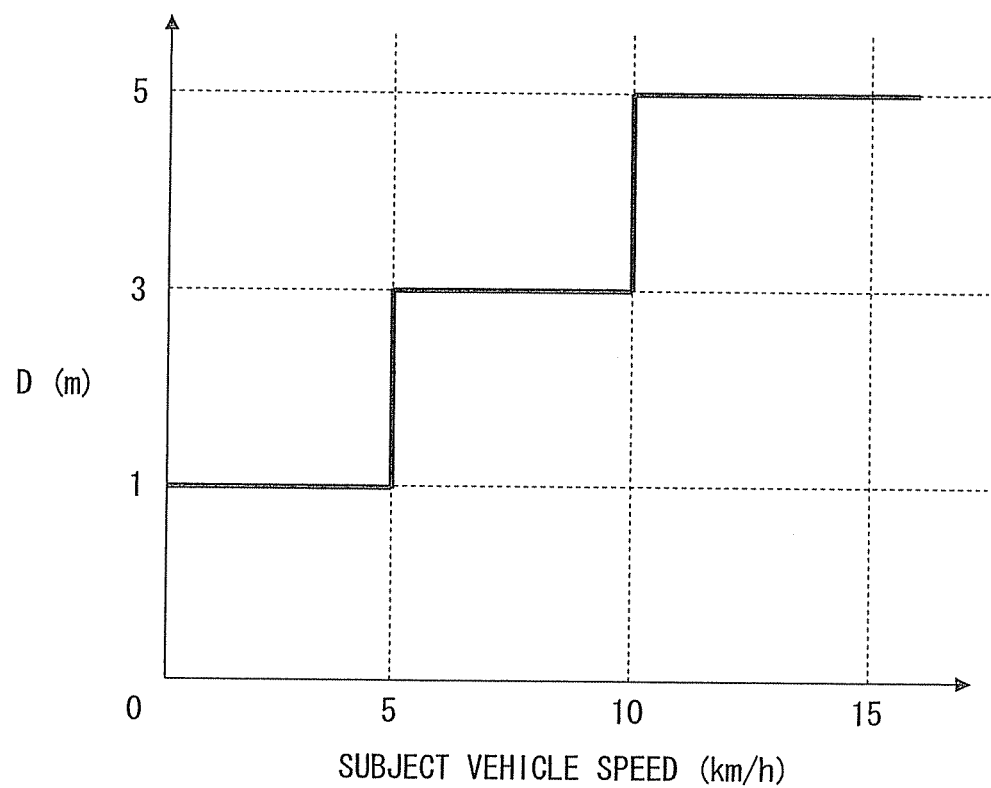
FIG. 8 is a graph for explaining a relationship between a subject vehicle speed and a distance "D".

Alternatively, as shown in FIG. 8, the distance "D" is defined as to be longer stepwise as the subject vehicle speed increases. As the subject vehicle speed increase, a braking distance is increased. Thus, in order to ensure a safety, the distance "D" is made longer as the subject vehicle speed increases.

Figure 3C:
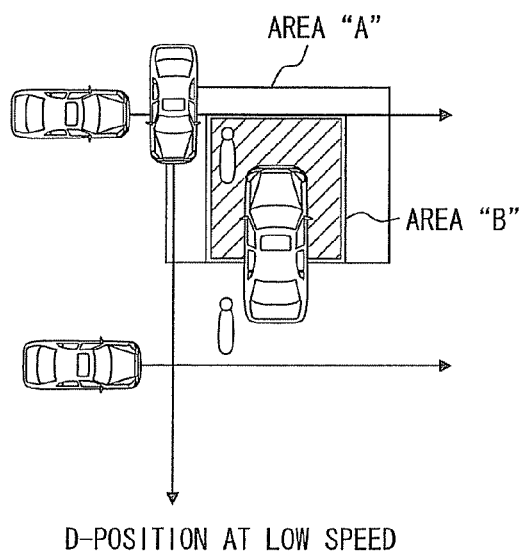
Figure 3D:
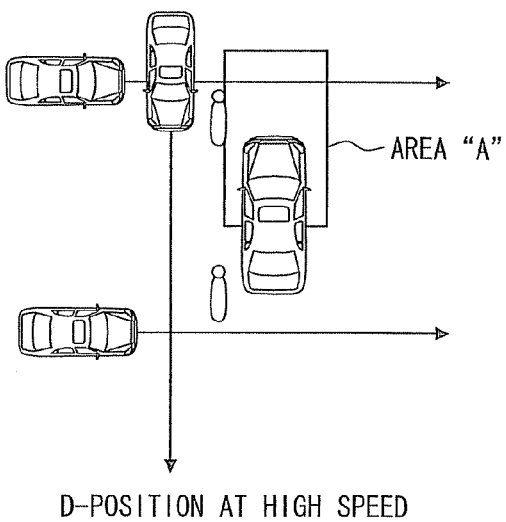

After the process in step S160 is completed, the procedure proceeds to step S170. When the answer is NO in step S150, the procedure proceeds to step S170. In step S170, a sensing direction is determined. As shown in FIGS. 3B and 3C, the sensing direction of the external-object detecting portion 21 is determined so that the area "A" and the area "B" are included in a sensing area of the portion 21 as wide as possible.

In step S180, an information about an external object is obtained. The external object includes the external object which the portion 21 detects and the external object detected by the vehicle-to-vehicle communications. The information of the external object includes a relative-displacement vector of the external object. If no external object exists around the subject vehicle, the information about an external object is not obtained.

In step S210, it is determined whether the obtained information includes an information about unselected (new) external object. When the answer is NO in step S210, the collision avoidance control is immediately terminated. When the answer is YES in step S210, the procedure proceeds to step S220 in which one of unselected (new) external objects is selected. Then, the procedure proceeds to step S230 in which it is determined whether the selected external object is a high-speed moving object or a low-speed moving object based on a moving speed of the selected external object, which corresponds to a difference between a relative movement vector of the external object and a relative movement vector of the subject vehicle.

Based on whether the moving speed of the external object exceeds a reference speed (for example, 20 km/h), it is determined whether the selected external object is a high-speed moving object or a low-speed moving object. In step S310, it is determined whether the selected external object is a high-speed moving object. In order to avoid an erroneous warning, the external object is categorized into the low-speed moving object and the high-speed moving object. Since the area "A" is defined in such a manner as to consider that a locus of the high-speed moving object varies, the area "A" is applied to the high-speed moving object. This area "A" is referred to as an enter-determination area. Meanwhile, the area "B" is defined in such a manner as to consider that a locus of the low-speed moving object does not vary. Thus, the area "B" is applied to the low-speed moving object. This area "B" is referred to as an exist-determination area. Moreover, according to the moving speed of the object, a driver's recognition of the moving object is varied. It is preferable to define the area based on the driver's recognition.

When the answer is YES in step S310, the procedure proceeds to step S320 in which an estimated locus of the external object is computed. For example, a line segment which corresponds to a prolonged movement vector of the external object is defined as the estimated locus.

In step S330, it is determined whether the estimated locus passes through the area "A". When the answer is YES, the procedure proceeds to step S360. When the answer is NO, the procedure goes back to step S210.

When the answer is NO in step S310, the procedure proceeds to step S340 in which a current position (coordinates) of the external object is computed. Then, the procedure proceeds to step S350 in which it is determined whether the current position of the external object is in the area "B".

When the answer is NO in step S350, the procedure goes back to step S210. When the answer is YES in step S350, the procedure proceeds to step S360 in which a command signal is outputted to the collision-avoidance-control executing portion 24 and the warning portion 25. Then, the collision avoidance control is terminated.

Advantage of Embodiment

The collision avoidance system 1 includes the computing portion 10 and the warning portion 25. The computing portion 10 obtains the information about whether the subject vehicle is stopped or traveling forward (backward). Further, according to this information, the computing portion 10 defines a subject area in which it is likely that an external object may be in contact with the subject vehicle. If the external object will be in contact with the subject vehicle in the subject area, the computing portion outputs an information about this situation.

The computing portion 10 can defines the appropriate subject area according to the vehicle traveling direction. As a result, it can be appropriately determined whether the external object is likely to be in contact with the subject vehicle or the external object is less likely to be in contact with the subject vehicle based on whether the external object exists in the subject area or will move into the subject area. The warning portion 25 can make a warning with high accuracy.

Moreover, the computing portion 10 controls the external-object detecting portion 21 so as to search the external object as wide as possible.

Even if the external-object detecting portion 21 has a directivity, the portion 21 is appropriately controlled by the computing portion 10.

Furthermore, the computing portion 10 defines the enter-determination area for a high-speed moving object and the exist-determination area for a low-speed moving object, and obtains an information about movement vector of the external object. Based on this information, the computing portion 10 determines whether the external object is a high-speed moving object or a low-speed moving object, and determines whether the high-speed moving object will moves into the enter-determination area. Further, the computing portion 10 determines whether the low-speed moving object exists in the exist-determination area. If the high-speed moving object will moves into the enter-determination area or the low-speed moving object exists in the exist-determination area, the computing portion 10 outputs a signal indicating that the subject vehicle is likely to come into contact with an external object.

The computing portion 10 can set the subject area according to the moving speed of the external object, whereby the detecting accuracy of the external object can be improved.

The computing portion 10 varies a size and a position of the subject area according to the subject vehicle speed. Specifically, the exist-determination area for low-speed moving object is set narrower as the subject vehicle speed becomes higher. The enter-determination area for high-speed moving object is set wider as the subject vehicle speed becomes higher.

Since the computing portion 10 sets the subject area also in view of the subject vehicle speed, the detecting accuracy is further improved. No unnecessary signal is outputted. The subject area of appropriate size is determined according to the subject vehicle speed. The signal is appropriately outputted to avoid a collision.

Other Embodiments

The present invention should not be limited to the above embodiment, but may be implemented in other way without departing from the sprit of the invention.

When defining the area "A" or the area "B" (step S140 or step S160), the computer may computes an unavoidable area where the external object unavoidably comes in contact with the subject vehicle and may define the subject area in such a manner as to exclude the unavoidable area. Specifically, when the shift-position of the subject vehicle is D-position or R-position, the areas denoted by "D2" and "W2" in FIG. 6A correspond to the unavoidable areas.

That is, the external object in the unavoidable area can not avoid a contact with the subject vehicle even if the computing portion 10 outputs a signal indicating this situation. Further, it is likely that the external object in the unavoidable area has been already detected, so that it is unnecessary for the computing portion 10 to output new signal indicating this situation. Furthermore, it is likely that the external object detected in the unavoidable area may be an erroneously detected object. For the reasons above, the unavoidable area may be excluded from the subject area and a signal indicating the external object in the unavoidable area less comes into contact with the subject vehicle may be outputted.

Since the unavoidable area is excluded from the subject area, superfluous (unnecessary) output, such as superfluous warning, can be avoided.

Figures 6A, 6B:
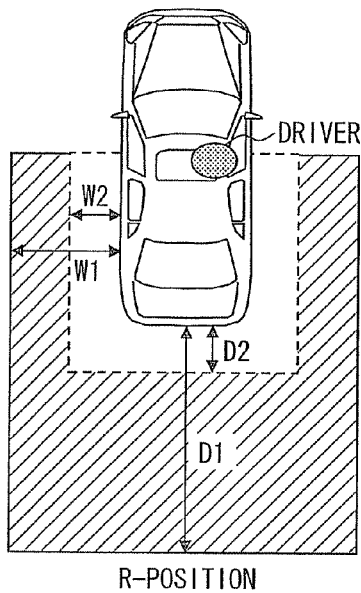
FIG. 6A is a bird's-eye view for explaining areas according to another embodiment.
FIG. 6B is a table for explaining distances.
Figure 7A:
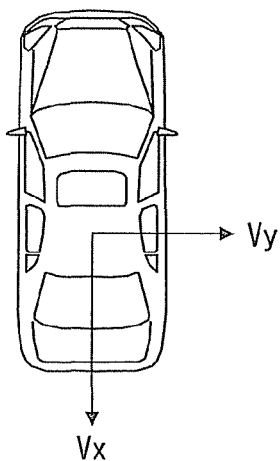
FIG. 7A is a bird's-eye view for explaining areas according to the other embodiment.
Figure 7B:
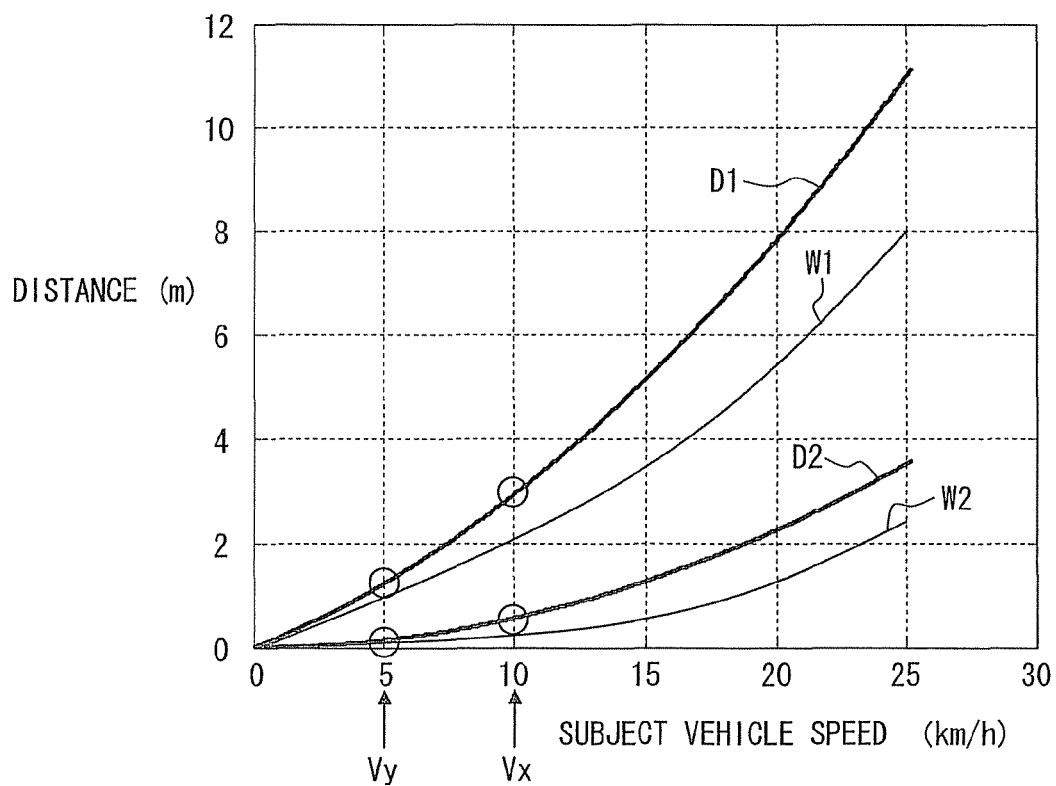
FIG. 7B is a graph for explaining a relationship between a subject vehicle speed and distances.

The size of the area "A" and the area "B" (width and length) can be varied according to a braking performance and the other characteristics as shown in FIG. 6B. A speed in a longitudinal direction of the subject vehicle is denoted by "Vx", and a speed in a width direction of the subject vehicle is denoted by "Vy", as shown in FIG. 7A. The distances "D1", "D2", "W1" and "W2" can be derived from a graph representing a relationship between the vehicle speed and a distance, as shown in FIG. 7B.

As indicated in a table of FIG. 6B, the distances "D1" and "W1" correspond to a brake stopping distances in a case that the subject vehicle speed is gradually decreased by deceleration of 0.4 G after a free running time of 0.7 seconds. Further, the distances "D2" and "W2" correspond to brake stopping distances in a case that the subject vehicle speed is rapidly decreased by deceleration of 0.7 G (sudden braking). For example, in a case that "Vx" is 10 km/h and "Vy" is 5 km/h, it is obtained that "D1" is 3.0 m, "D2" is 0.5 m, "W1" is 0.425 m, and "W2" is 0.025 m as shown in FIG. 7B.

The values of free running time and deceleration can be arbitrarily established based on the performance of the subject vehicle and the characteristics of a driver.

In the above embodiment, when the shift-position is other than P-position, R-position, and D-position, the area "A" and the area "B" can be established in the same manner. For example, when the shift-position is N-position (neutral position), the areas "A" and "B" can be defined in a same manner as the case of P-position. When the shift-position is a second drive position (S-position) or a low drive position (L-position), the areas "A" and "B" can be defined in a same manner as the case of D-position.

In the above embodiment, the area "A" is employed as to the high-speed moving object and the area "B" is employed as to the low-speed moving object. Without respect to the moving speed of the external object, the area "A" is employed as to an external object which is coming close to the subject vehicle. The area "B" is employed as to an external object which has been already in the area.

What is claimed is:

1. A collision detector detecting a situation where a subject vehicle is likely to come into contact with an external object, the collision detector comprising:
   a subject area defining portion which defines a subject area including an enter-determination area and an exist-determination area, the enter-determination area being defined to determine that the external object entering therein is likely to come into contact with the subject vehicle, the exist-determination area being defined to determine that the external object existing therein is likely to come into contact with the subject vehicle;
   an information obtaining portion which obtains an information about a movement vector of the external object;

a first determining portion which determines whether the external object moves into the enter-determination area based on the information about the movement vector;

a second determining portion which determines whether the external object exists in the exist-determination area;

an output portion which executes a collision avoidance control in order to avoid a situation where the subject vehicle is likely to come into contact with the external object when the external object comes into the enter-determination area or when the external object exists in the exist-determination area;

a speed determining portion which determines, based on the obtained information about the movement vector, whether the external object is a high-speed moving object of which moving speed is not less than a reference speed or a low-speed moving object of which moving speed is less than the reference speed, wherein the first determining portion determines whether the high-speed moving object moves into the enter-determination area, and a second determining portion determines whether the low-speed moving object exists in the exist-determination area.

2. A collision detector according to claim 1, wherein, the subject area defining portion varies a size or a position of the subject area according to a subject vehicle speed.

3. A collision detector according to claim 2, wherein the subject area defining portion defines the exist-determination area narrower as the subject vehicle speed becomes higher.

4. A collision detector according to claim 2, wherein the subject area defining portion defines the exist-determination area wider as the subject vehicle speed becomes higher.

5. A collision detector according to claim 2, wherein: the subject area defining portion defines the enter-determination area wider as the subject vehicle speed becomes higher.

6. A collision detector according to claim 1, wherein an unavoidable area computing portion which computes an unavoidable area where the external object unavoidably comes into contact with the subject vehicle, based on a speed and a braking performance of the subject vehicle, wherein the unavoidable area computing portion defines the subject area in such a manner as to exclude the unavoidable area.

7. A collision detector according to claim 1, further comprising:

an object detection portion which detects the external object; and a direction indicating portion which indicates a direction in which the object detection portion is able to detect the external object in the subject area as wide as possible.

8. A warning apparatus which makes a warning in a situation where a subject vehicle is likely to come into contact with an external object, the warning apparatus comprising:

a detecting portion detecting an external object which is likely to come into contact with the subject vehicle; and a warning portion making a warning when the detecting portion detects an external object which is likely to come into contact with the subject vehicle, wherein the detecting portion is the collision detector according to claim.

9. A collision detector according to claim 1, wherein the output portion executes the collision avoidance control in which a warning is made to a driver of the subject vehicle to notify that that the subject vehicle will be in contact with the external object when the external object exists in the subject area or the external object comes into the subject area.

10. A collision detector according to claim 1, wherein the output portion executes the collision avoidance control in which a subject vehicle speed is automatically reduced when the external object exists in the subject area or the external object comes into the subject area.

11. A collision detector detecting a situation where a subject vehicle is likely to come into contact with an external object, the collision detector comprising:

a travel direction obtaining portion which obtains a traveling-direction information about whether the subject vehicle is stopped or is going to be stopped, or the subject vehicle is traveling forward or backward or is going to travel forward or backward;

a subject area defining portion which defines a subject area in which it is likely that the external object may be in contact with the subject vehicle;

an output portion which executes a collision avoidance control in order to avoid a situation where the subject vehicle is likely to come into contact with the external object when the external object comes into the enter-determination area or when the external object exists in the exist-determination area;

an unavoidable area computing portion which computes an unavoidable area where the external object unavoidably comes into contact with the subject vehicle, based on a speed and a braking performance of the subject vehicle, wherein the unavoidable area computing portion defines the subject area in such a manner as to exclude the unavoidable area.

12. A collision detector according to claim 11, further comprising:

an object detection portion which detects the external object; and a direction indicating portion which indicates a direction in which the object detection portion is able to detect the external object in the subject area as wide as possible.

13. A collision detector according to claim 11, wherein the subject area defining portion defines a high-speed area for determining whether a high-speed moving object will come into contact with the specific vehicle, the subject area defining portion defines a low-speed area for determining whether a low-speed moving object will come into contact with the specific vehicle, further comprising:

an information obtaining portion which obtains an information about a movement vector of the external object;

a speed determining portion which determines whether the external object is the high-speed moving object or the low-speed moving object based on the obtained information;

a first determining portion which determines whether the high-speed moving object will come into the high-speed area; and a second determining portion which determines whether the low-speed moving object exists in the low-speed area; wherein an output portion which outputs that the subject vehicle is likely to come into contact with the external object when the high-speed moving object comes into the high-speed area or when the low-speed moving object exists in the low-speed area.

14. A collision detector according to claim 13, wherein the subject area defining portion defines the low-speed area narrower as the subject vehicle speed becomes higher.

15. A collision detector according to claim 13, wherein the subject area defining portion defines the low-speed area wider as the subject vehicle speed becomes higher.

16. A collision detector according to claim 13, wherein: the subject area defining portion defines the high-speed area wider as the subject vehicle speed becomes higher.

17. A collision detector according to claim 11, wherein the subject area defining portion varies a size or a position of the subject area according to the subject vehicle speed.

18. A warning apparatus which makes a warning in a situation where a subject vehicle is likely to come into contact with an external object, the warning apparatus comprising:

a detecting portion detecting an external object which is likely to come into contact with the subject vehicle; and a warning portion making a warning when the detecting portion detects an external object which is likely to come into contact with the subject vehicle, wherein the detecting portion is the collision detector according to claim 11.

19. A collision detector according to claim 11, wherein the output portion executes the collision avoidance control in which a warning is made to a driver of the subject vehicle to notify that that the subject vehicle will be in contact with the external object when the external object exists in the subject area or the external object comes into the subject area.

20. A collision detector according to claim 11, wherein the output portion executes the collision avoidance control in which a subject vehicle speed is automatically reduced when the external object exists in the subject area or the external object comes into the subject area.

21. A collision detector according to claim 11, wherein the travel direction obtaining portion corresponds to a shift-position sensor detecting a current shift-position of the subject vehicle.

* * * * *